Figure 1:
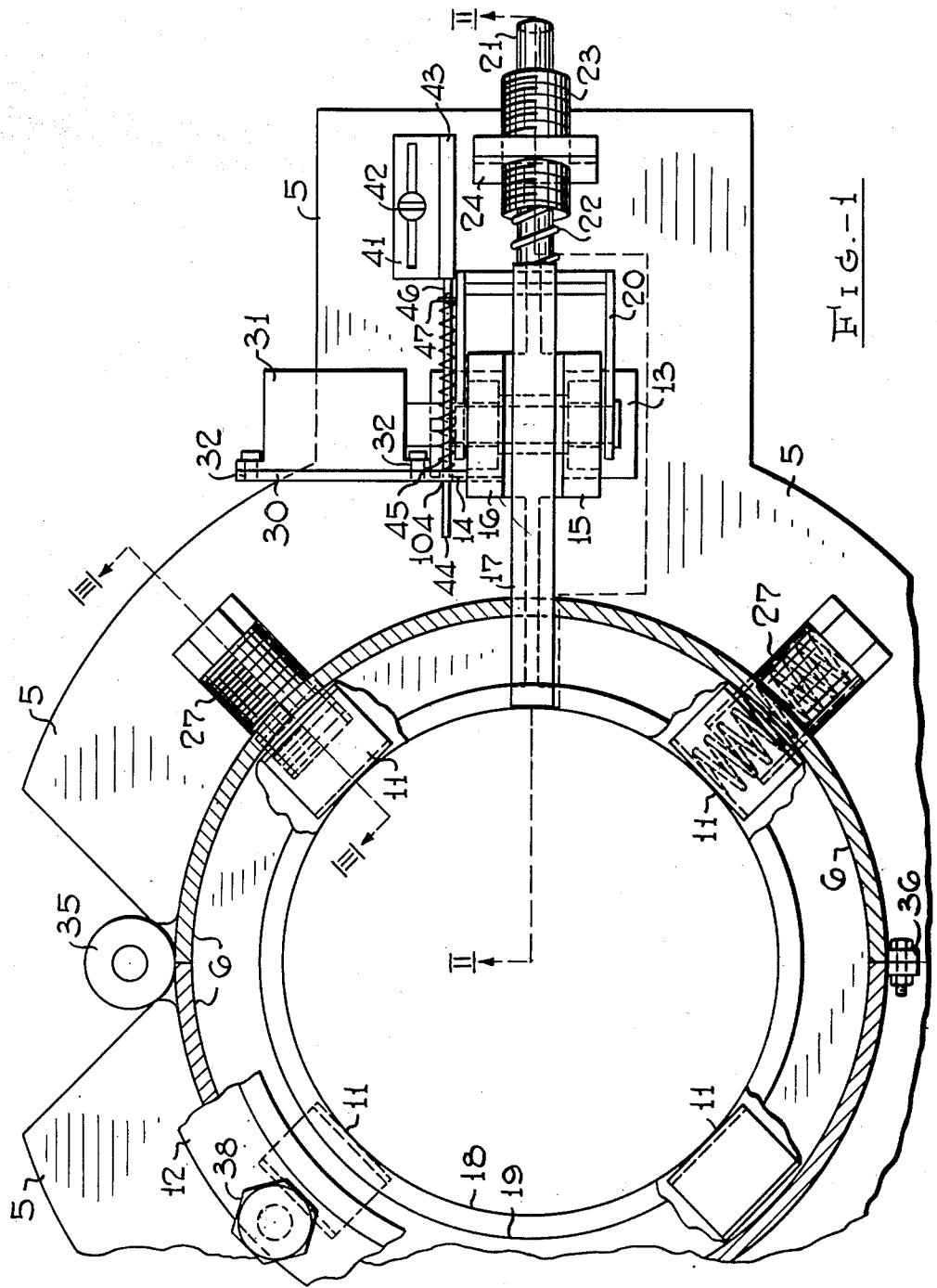

Feb. 24, 1953

G. H. LINK 2,629,257

DEVICE FOR MEASURING TOTAL LENGTH
OF ASSEMBLED WELL CASING

Filed May 7, 1949

5 Sheets-Sheet 3

George H. Link, Inventor

By W. O. J. Heilman, Attorney

Feb. 24, 1953

G. H. LINK 2,629,257

DEVICE FOR MEASURING TOTAL LENGTH
OF ASSEMBLED WELL CASING

Filed May 7, 1949

5 Sheets-Sheet 4

George H. Link   Inventor
By W. O. F Hulman  Attorney

George H. Link Inventor

Patented Feb. 24, 1953

2,629,257

UNITED STATES PATENT OFFICE 2,629,257

DEVICE FOR MEASURING TOTAL LENGTH OF ASSEMBLED WELL CASING

George H. Link, Denver, Colo.

Application May 7, 1949, Serial No. 91,904

3 Claims. (Cl. 73—151)

This invention relates to a device for measuring long strings of pipe that have been assembled by fastening shorter lengths together by means of collars or other couplings.

More particularly the invention relates to a device for measuring the total footage of a string of tubular goods such as casing, drill pipe, tubing, and the like being lowered into an oil well while at the same time counting the total number of individual lengths of the tubular material in the string.

For numerous reasons practically every well that is drilled for natural gas or oil is cased with one or more columns or strings of metal pipe. For example, it is usually necessary to support the walls of the well to prevent the caving in of unconsolidated formations. Metal casing also serves to prevent water from entering oil or gas yielding strata from overlying or underlying formations. Still another purpose in using casing is to prevent the escape of gas or oil into overlying formations.

It is often very important to know the exact length of casing lowered into the well. This is particularly true with regard to the oil string, that is the casing that penetrates the oil sand. One must be sure that the portion of casing that has been perforated to admit oil into the pipe will be at the right depth, otherwise the perforated portion of the casing will not be adjacent to the oil producing strata. Although it is possible to make an approximate determination of the length of a column of pipe by measuring each joint that goes into the column of pipe, the sum of such measurements will not always give the exact length of the column because of variations in the lengths of the threaded ends in the couplings. To avoid this source of error some operators have measured the lengths of casing by measuring the length of each set or joint with a steel tape after the joints have been fitted up and are all ready to be lowered into the well. This method is not too satisfactory, however, because of the possibility of errors in measuring so many lengths of pipe, as well as the possibility of the operator forgetting to record every length of pipe that is used.

Experience has proved that the greatest source of error in measuring pipe or casing is the human element. Very frequently one length of casing will be added to the string without being tallied or a length will be tallied without being added, or the same length will be tallied twice, so that the assumed length of pipe or casing will be seriously in error, often causing mistakes in completing the well which have involved considerable time, trouble and expense to correct. Thus the need for a method of eliminating this source of error is readily apparent.

It is an object of the present invention to provide a simple device for measuring automatically the total length of pipe or casing being assembled and lowered into a well. Another object is to provide in the same device a means for tallying the total number of individual lengths of pipe that are connected together in assembling the string of pipe. A record of the total number of individual lengths serves as a double check on the total measured length and, at the same time, is of help for accounting purposes. Other and further objects of the invention will be apparent from the ensuing description and from the drawings.

Briefly, the apparatus of the present invention is adapted to surround the assembled casing and to measure it as it is being lowered into the well hole, simultaneous measurement being made of the total length of the assembled pipe passing through the device and of individual lengths of pipe that make up the assembly.

Figure 2:
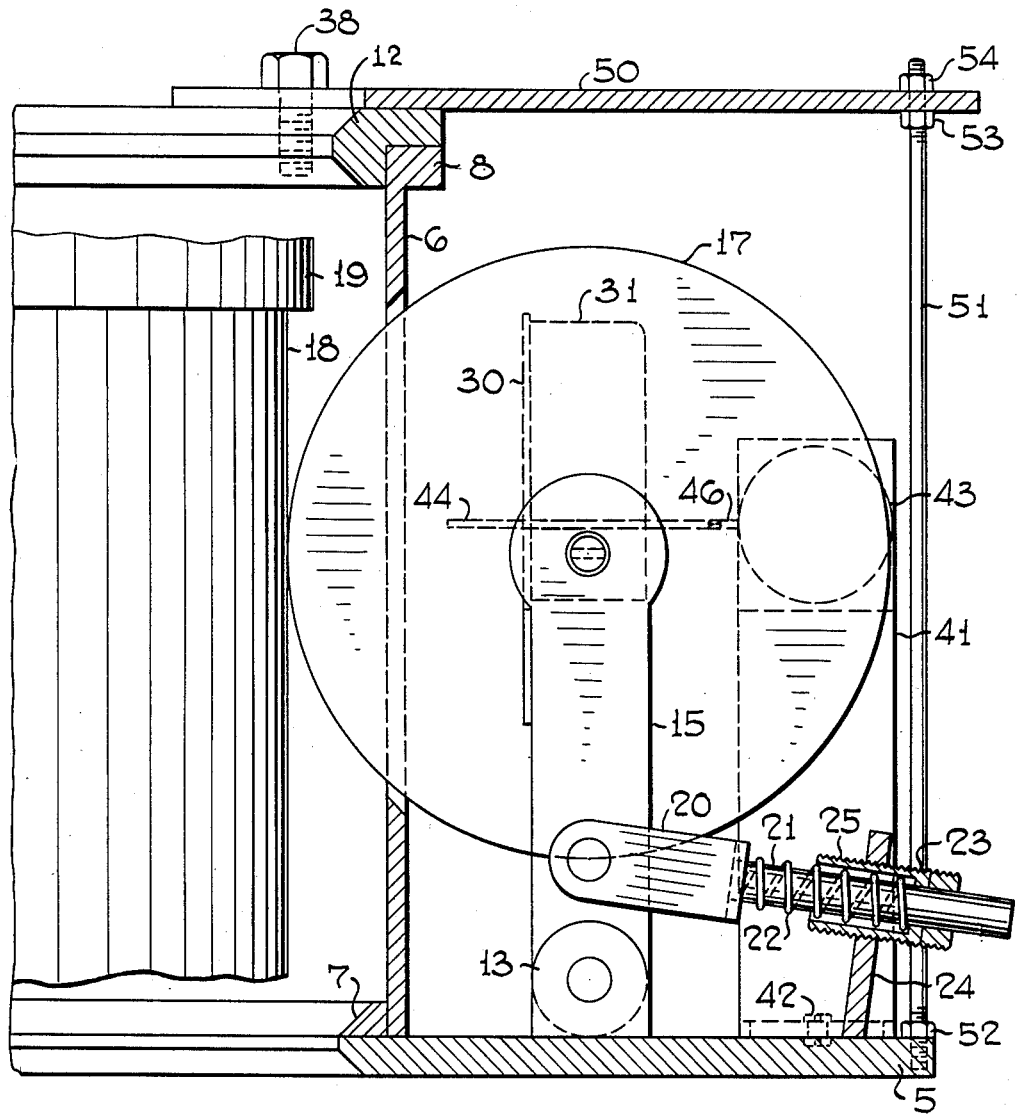
Figure 3:
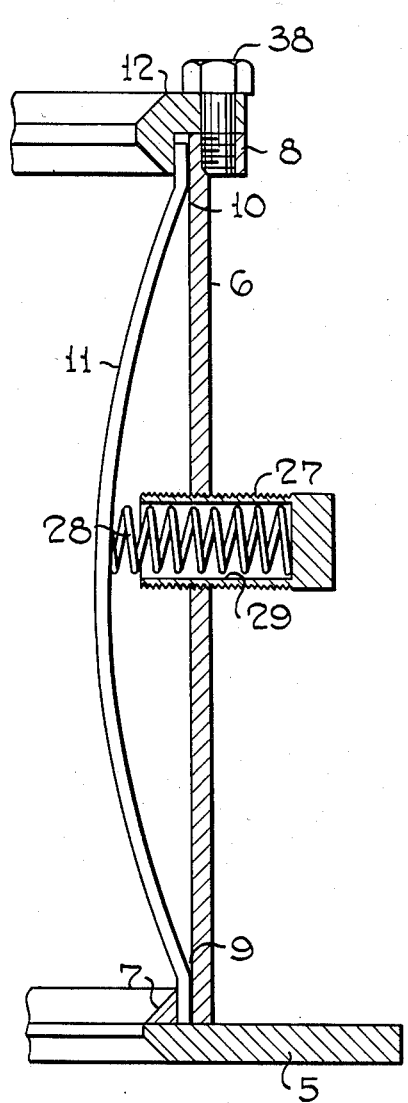
Figure 6:
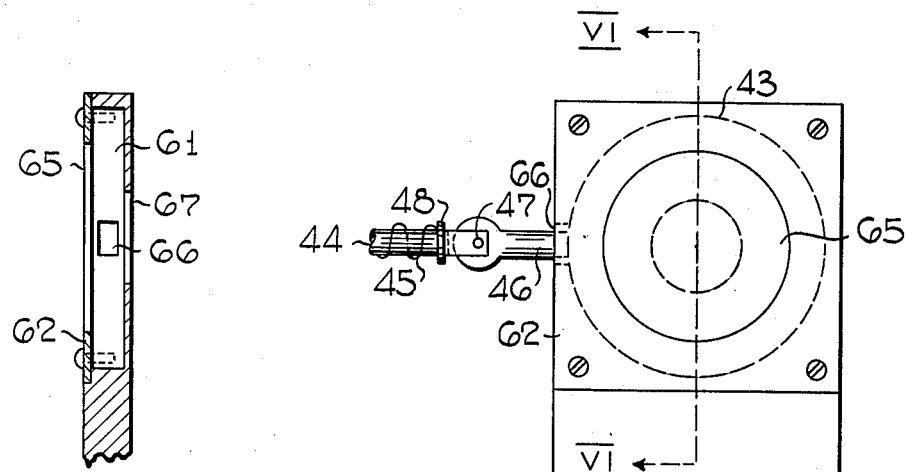
Figure 4:
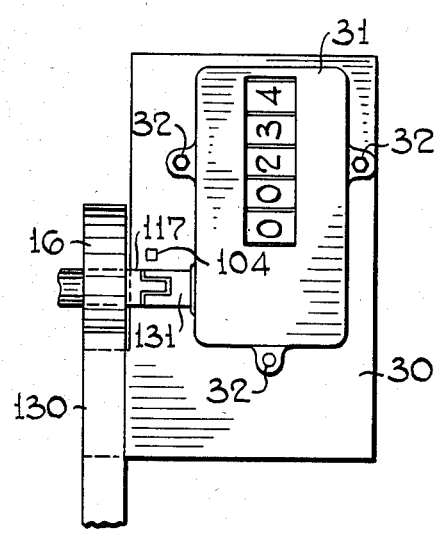
Figure 5:
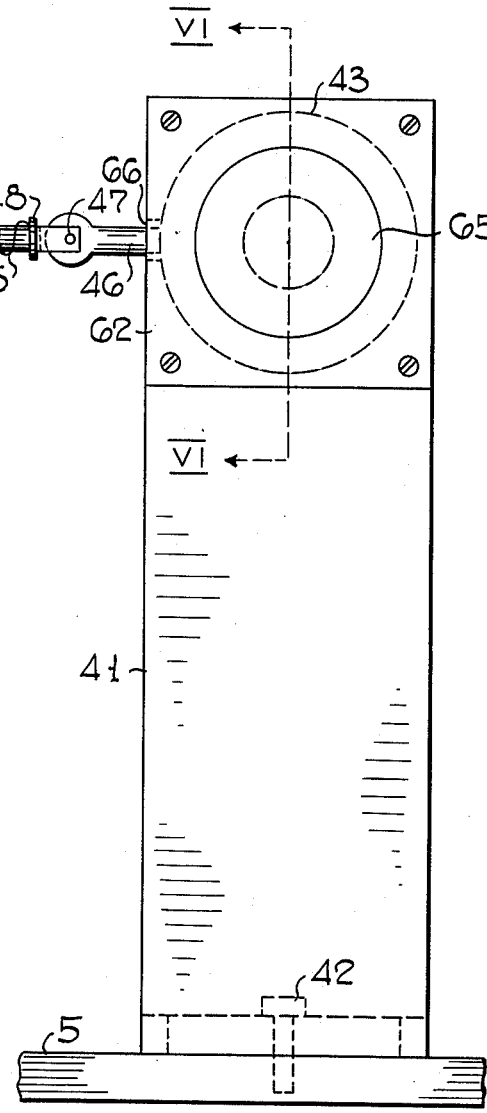
Figure 7:
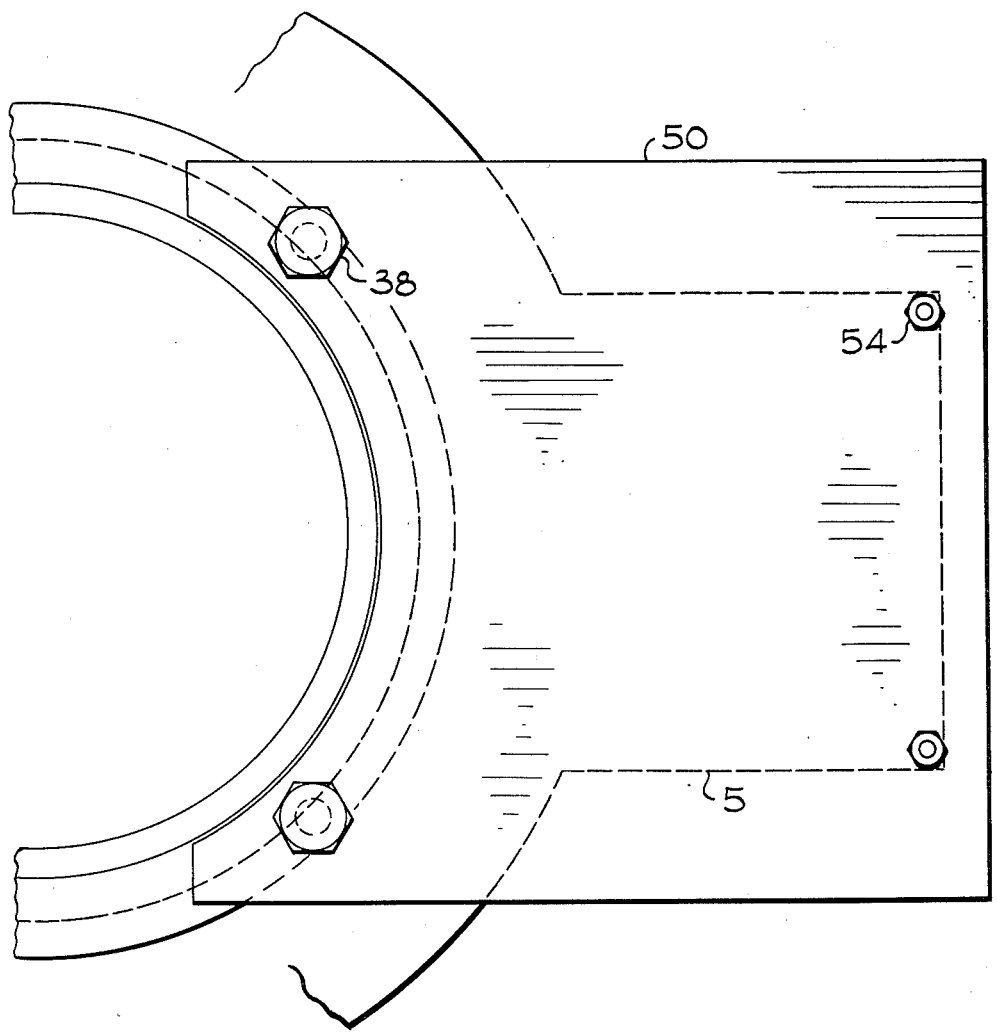

With reference to the drawings Fig. 1 represents a top plan view of the measuring device with a protection cover removed. Fig. 2 is a side elevation of the device, partly in cross-section, and Fig. 3 is a cross-section elevation of a portion of Fig. 1 showing the arrangement of centering springs in the device. Figs. 4, 5 and 6 depict details of the manner of mounting the measuring and tallying instruments of the device and Fig. 7 is a top plan view which shows the manner of mounting a protection plate for the assembled device.

With particular reference to Figs. 1 and 2, it will be seen that the device is mounted on a base 5, which supports a cylindrical sleeve 6 adapted to surround the pipe or casing to be measured. Also fastened to the base are yoke supports 13 and 14 to which are pivotally attached wheel yokes 15 and 16 which in turn support measuring wheel 17. Yoke supports 13 and 14 are so positioned that wheel 17 will make firm contact with casing 18 as it is lowered into the well. In order that wheel 17 will be held directly against the casing a compression spring assembly is provided. This assembly comprises a compression yoke 20 which is pivotally fastened to wheel yokes 15 and 16. Attached to compression yoke 20 is an arm 21 which fits into spring holder 23 which is supported on bracket 24 fastened to base 5. A helical compression spring 22 is wound around arm 21. Spring holder 23 is provided with threads 25 which are adapted to fit into similar threads in the opening on bracket 24 so that the holder 23 acts as an adjusting screw for adjusting the compression in spring 22.

The number of revolutions made by wheel 17 is counted by a revolution counter 31 which is connected directly to the shaft of wheel 17. Counter 31 is mounted on bracket 30 by means of bolts 32. Bracket 30 is in turn mounted on or welded to wheel yoke 16. A hole 104 is provided in bracket 30 through which passes collar counter shaft 44 around which is wound a helical safety spring 45. Shaft 44 is connected to actuating arm 46 of collar counter 43, the connection between arm 46 and shaft 44 being made by means of pivoted connection 47 to allow for out-of-line movement of shaft 44 with respect to arm 46. These details are shown more clearly in Fig. 5. Shaft 44 is suitably designed with a shoulder 48 so that one end of spring 45 will be pressed against it. The other end of spring 45 presses against bracket 30. Collar counter 43 is mounted on bracket 41 which is fastened to base 5. Small adjustments in the position of collar counter 43 can be made by means of adjusting screw 42.

A suitable method of mounting collar counter 43 on bracket 41 is shown in detail in Figs. 5 and 6, the latter being a section along line VI—VI of Fig. 5. The upper portion of bracket 41 is provided with a recess 61 which is adapted to receive counter 43 which is of circular shape, resembling a pocket watch. Counter 43 is held within the recess by removable cover plate 62 which is provided with an opening 65 to permit access to the setting mechanism of counter 43. A suitable opening 67 is also provided on the opposite side of bracket 41 to permit observation of the counter dial. Actuating arm 46 passes through opening 66. Coupling of the actuating arm 46 with shaft 44 has already been described.

The manner in which counter 31 and bracket 30 are mounted on the device is apparent from Fig. 4 which shows a view of a portion of wheel yoke 16 looking toward sleeve 6. Bracket 30 is rectangular in shape and has a lip 130 which is welded to the back of wheel yoke 16. The particular counter 31 depicted is one that is provided with gearing within its housing to convert a definite number of revolutions of its shaft 131 into a single indicated revolution on the counter dial. Thus with the proper gear ratio and with the proper diameter of wheel 17 counter 31 can be made to give a direct reading in feet, for example. Shaft 131 is provided with a slot or fork which is adapted to receive the flat tongue portion of wheel shaft 117 so that motion of wheel 17 can be communicated to counter 31.

Turning now to sleeve 6, shown in partial cross section in Fig. 3, it will be seen that this is provided at the top with an annular shoulder 8. At four equally spaced points around the circumference of this shoulder, holes are drilled to receive threaded bolts 38. Placed on top of the sleeve 6 is a circular ring 12 having holes drilled at four equally spaced points to permit it to be held in place by means of the bolts 38 that can be screwed into holes in the shoulder 8. At approximately the same spaced points the underside of the ring 12 is provided with slots or grooves 10, each slot being adapted to receive the end of a leaf spring 11. An annular ring 7 is attached to base 5 and to the bottom of sleeve 6 and is provided with slots 9 each of which is adapted to receive the opposite end of one of the leaf springs 11. At each of the four above named positions around the circumference of the sleeve 6 at a point intermediate of the ends of the sleeve is placed a spring holder 27 adapted to receive a helical back-up spring 28 which contacts one side of each of the leaf springs 11. Each spring holder 27 is provided with threads 29 which mesh with similar threads in the openings provided in sleeve 6 so as to permit adjustment of compression in the spring 28. The sleeve assembly is preferably split longitudinally into two sections and is provided with at least one hinge 35 and at least one clamp 36 to permit the opening of the sleeve through its diameter so as to permit the placing of the measuring device around the casing. Preferably, two hinges are provided, one located near the bottom of the sleeve and one near the top of the sleeve, together with two clamps at corresponding positions on the opposite side of the sleeve. Base 5 is, of course, similarly split in a cooperating manner.

In order to protect the device of this invention from material or objects that might drip or fall onto it from the derrick floor, such as mud, water, debris, etc., it is advisable to provide a protective cover or plate 50 as shown in Fig. 2. This may be suitably supported by rods 51, which are screwed into threaded holes in base plate 5 and held in place by lock nuts 52. Cover 50 is held in place on one end by two sets of nuts 53 and 54 screwed onto the threaded ends of rods 51 and on the other end by two of the bolts 38 which hold ring 12 in place. As shown in Fig. 7, which is a top view of a portion of the device, cover 50 is suitably shaped so that the end held by bolts 38 will lie on ring 12 along an appreciable portion of its circumference.

The operation of this device is essentially as follows: the base of the apparatus is placed on top of the blowout preventer at the top of the well after the first section of casing is ready to be lowered into the well. This procedure is necessary in order that the casing shoe, centering devices, etc., may be attached to the bottom of the casing, since these items are too large to pass through sleeve 6. The length of casing below the measuring wheel is noted and this length is later added to the total length of casing measured by the wheel. As the casing is lowered into the well, wheel 17 is caused to rotate by virtue of its contact with the casing. The diameter of the wheel is preferably so selected that the total number of recorded revolutions of the wheel can be multiplied by a simple factor to give the measurement of the total length. For example, a wheel diameter of 7.639 inches will give a registered number which may be multiplied by 2 to give the total measurement in feet. With this size wheel the registered number can be made to give the measurement in feet directly by providing a counter which records every half revolution of the wheel. Whenever a casing collar 19 is encountered, the wheel and wheel yoke assembly are moved out of line sufficiently to cause bracket 30 to exert sufficient pressure on safety spring 45 to actuate collar counter 43. If for some reason the wheel and wheel yoke should be thrown out of line to a much greater degree than necessary to actuate the collar counter the excess throw of the wheel will be taken up by the safety spring 45 and not cause damage to the collar counter.

In order to provide for accurate measurements there must be no slippage between casing 18 and wheel 17. Such slippage can be prevented by providing the contact surface of the wheel with knurling or by supplying a suitable non-slipping surface such as one of natural or synthetic rubber or of a suitable plastic material. The wheel 17 may be held against the casing 18 with the proper amount of pressure by an adjustment of the compression in the helical compression spring 22 by means of the compression spring adjusting screw 23. Leaf springs 11 serve to keep the casing centered in the measuring device. Any excessive thrust against these springs is absorbed by the back-up springs 28.

The helical back-up springs 28 serve the double function of minimizing the probability of leaf springs 11 breaking if the latter are subjected to a sudden thrust and of selectively increasing the rigidity of the leaf springs 11 so that proper centralization of the mechanism can be accomplished, which is necessary to ensure proper working of the collar counter 43.

The advantages of the device of the present invention are readily apparent. For example, as has already been pointed out, by providing a separate counter to record the total number of individual lengths of pipe a direct reading is readily available for accounting purposes and at the same time a double check on the measured length of pipe is provided in cases where the individual pieces of pipe are of substantially the same length.

One of the more important advantages of the combination of a revolution counter and a collar counter is to provide for a correction factor to allow for error in the indicated length of pipe caused by the measuring wheel traveling over each collar as the casing is lowered into the well. Since collar 19 as shown in Figure 2 is of larger diameter than casing 18 it is apparent that, when the pipe is lowered a given distance, wheel 17 will travel a greater distance when a collar is encountered than it will when no collar is encountered. Thus the existence of collars introduces an error in the indicated length of pipe as determined from the revolution counter 31. The amount of error introduced by each collar can be calculated readily from the relative diameters of casing 18 and collar 19 and from the size of wheel 17. Knowing the number of collars measuring wheel 17 has passed over, from the reading given by collar counter 43, it is then a simple matter to determine the total error introduced by the collars and subtract this from the value ascertained from counter 31.

It is apparent that numerous adjustments and variations may be made in the design of this device without departing from the spirit of the invention. For example, although the base 5 has been described as being adapted to be mounted on the blowout preventer of an oil well, it is obvious that the base could be designed so that the device could be hung from the rotary table or the derrick floor or else set on top of, in, or below the casing slips which are normally set on the rotary table. Furthermore, although the device has been described principally for use in measuring casing it can likewise be adapted for measuring drill pipe being added during drilling operations. It is not intended that this invention be limited by the particular design presented but only by the following claims.

What is claimed is:

1. An apparatus for measuring pipe being lowered into an oil well which comprises in combination a base, a cylindrical sleeve mounted on said base and adapted to surround said pipe, a yoke support attached to said base, a wheel yoke pivotally mounted on said yoke support, a measuring wheel mounted on said wheel yoke, said yoke support and wheel yoke being so positioned as to place the periphery of said wheel into contact with said pipe when said sleeve surrounds said pipe, a compression yoke pivotally attached to said wheel yoke and provided with adjustable spring means for holding said wheel against said casing and for absorbing motion of said wheel yoke on its pivot, a revolution counter mounted on said wheel yoke, means actuating said counting device upon rotation of said wheel, a second counting device mounted on said base, and means actuating said second counter upon substantial lateral movement of axis of said wheel with respect to said sleeve.

2. An apparatus for measuring pipe being lowered into an oil well which comprises in combination a base, a cylindrical sleeve mounted on said base and adapted to surround said pipe, a plurality of leaf springs held by said sleeve and disposed lengthwise within said sleeve and equally spaced around the circumference thereof, a plurality of helical compression springs, one of the latter being placed behind and in contact with each of said leaf springs at a point intermediate the ends of the leaf spring, a plurality of exteriorly threaded housings holding said helical springs, said housings being held in threaded openings in said sleeve so as to provide adjustable compression in said helical springs, a yoke support attached to said base, a wheel yoke pivotally mounted on said yoke support, a measuring wheel mounted on said wheel yoke, said yoke support and wheel yoke being so positioned as to place the periphery of said wheel into contact with said pipe when said sleeve surrounds said pipe, a compression yoke pivotally attached to said wheel yoke and provided with adjustable spring means for holding said wheel against said casing and for absorbing motion of said wheel yoke on its pivot, a revolution counter mounted on said wheel yoke, means actuating said counting device upon rotation of said wheel, a second counting device mounted on said base, and means actuating said second counter upon substantial lateral movement of the axis of said wheel with respect to said sleeve.

3. An apparatus for measuring pipe being lowered into an oil well which comprises in combination a base, a cylindrical sleeve mounted on said base and adapted to surround said pipe, said sleeve being split longitudinally into two sections, said base being split in a cooperating manner, at least one hinge fastening the said split parts together on one side, at least one clamp fastening the said split parts together on the opposite side from said hinge, a yoke support attached to said base, a wheel yoke pivotally mounted on said yoke support, a measuring wheel mounted on said wheel yoke, said yoke support and wheel yoke being so positioned as to place the periphery of said wheel into contact with said pipe when said sleeve surrounds said pipe, a compression yoke pivotally attached to said wheel yoke and provided with adjustable spring means for holding said wheel against said casing and for absorbing motion of said wheel yoke on its pivot, a revolution counter mounted on said wheel yoke, means actuating said counting device upon rotation of said wheel, a second counting device mounted on said base, and means actuating said second counter upon substantial lateral movement of the axis of said wheel with respect to said sleeve.

GEORGE H. LINK.

REFERENCES CITED

The following references are of record in the file of this patent:

UNITED STATES PATENTS

| Number | Name | Date |
| --- | --- | --- |
| 1,982,184 | Williams et al. | Nov. 27, 1934 |
| 1,988,785 | Dillon | Jan. 22, 1935 |
| 2,327,506 | Conrad et al. | Aug. 24, 1943 |
| 2,383,844 | Bouslog | Aug. 28, 1945 |